3,044,184
BATHYTHERMOGRAPH SIMULATOR
William Freeman Leuze, Waterford, Conn., assignor, by mesne assignments, to the United States of America as represented by the Secretary of the Navy
Filed Feb. 1, 1960, Ser. No. 6,082
8 Claims. (Cl. 35—19)

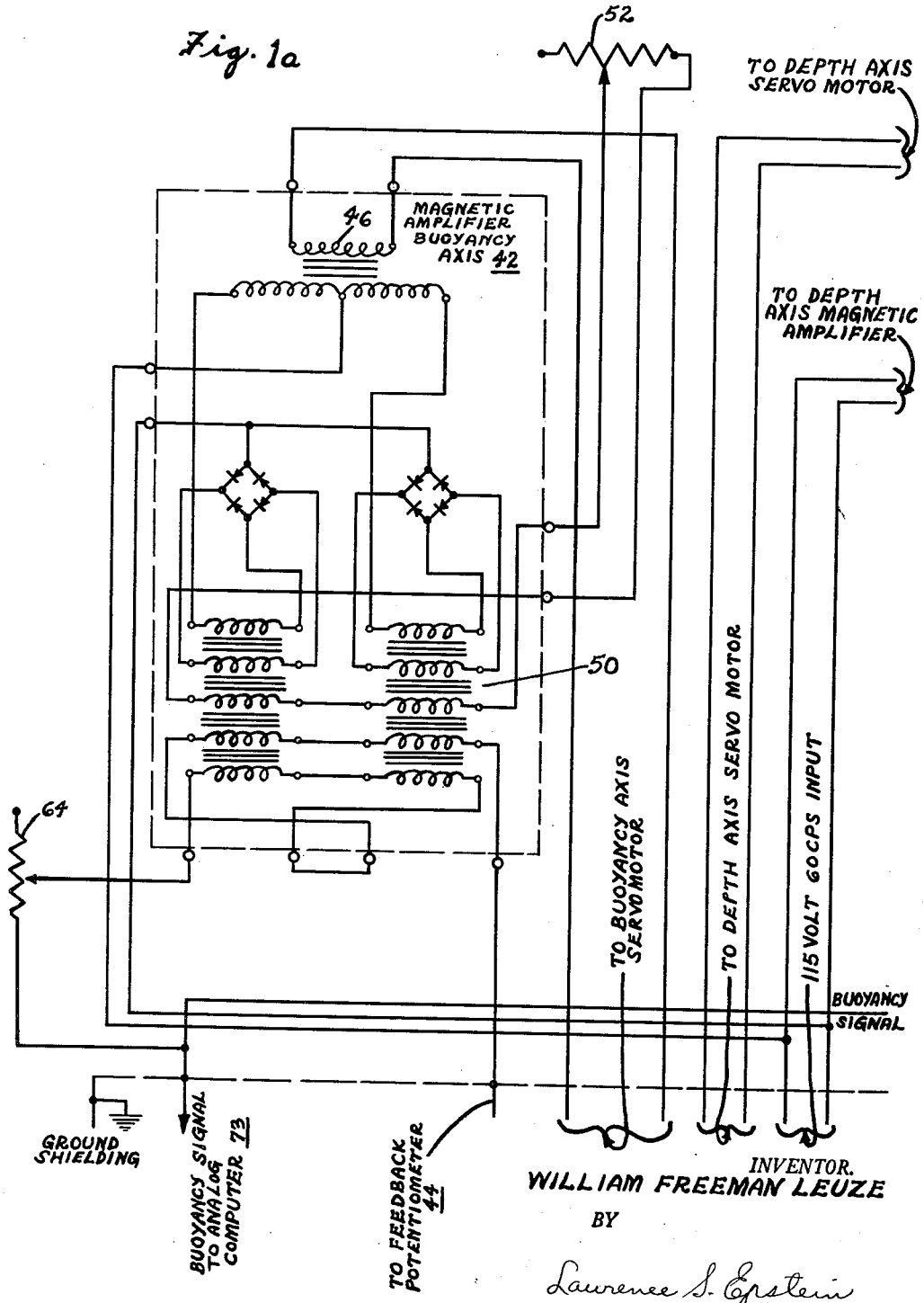

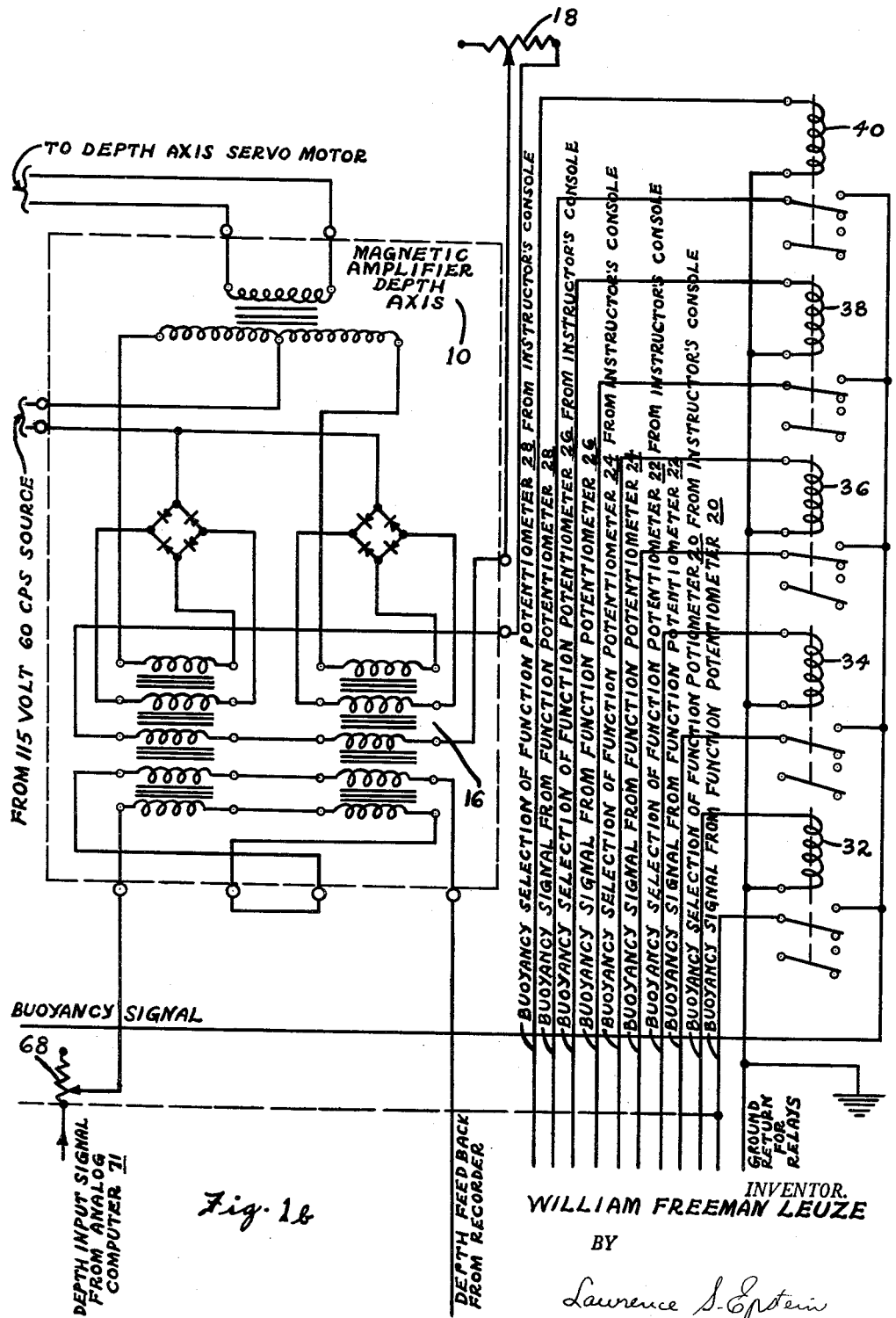

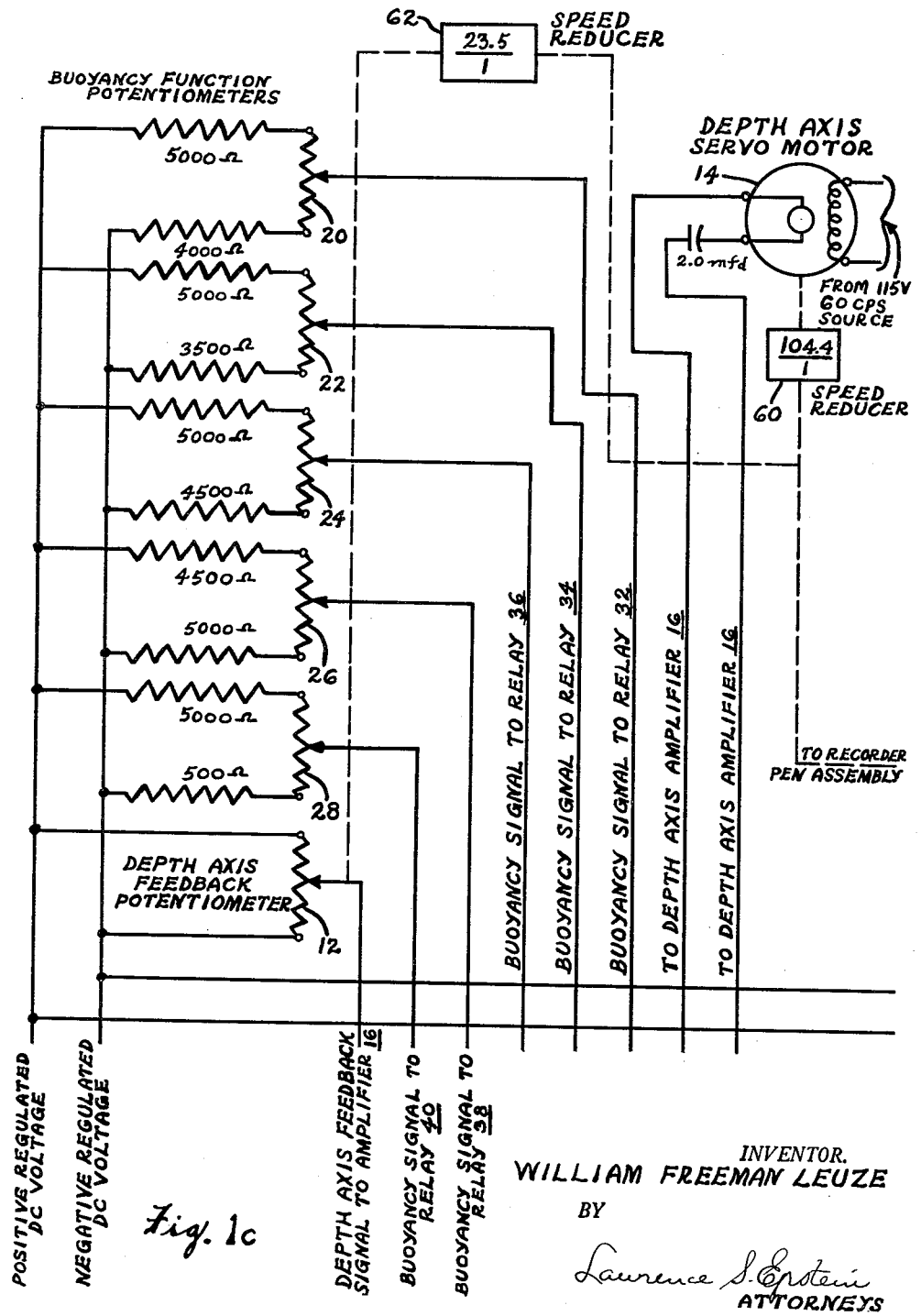

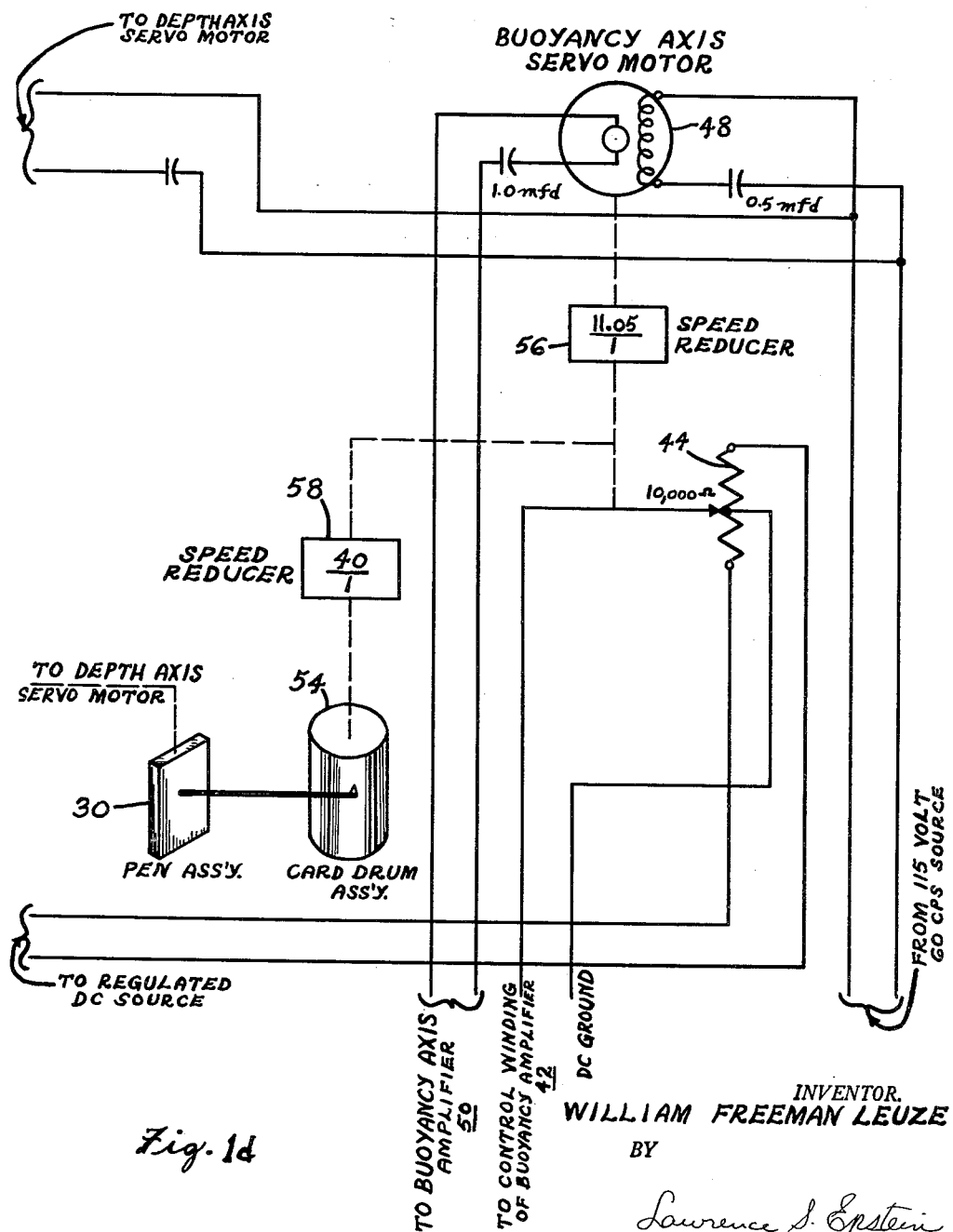

This invention relates to grounded navigation training apparatus and more particularly to grounded apparatus for teaching and practicing navigation of a submarine by means of the universal submarine simulator described in co-pending patent application Serial No. 3,466. The structure of this invention is particularly adapted to simulate the change in pressure acting upon a submarine due to changes in sea temperature and depth.

It is required that operating personnel in a submarine be provided with a visual indication of the changes in buoyancy to the submarine which are dependent upon the temperature, sea salinity, and hull compression resulting from sea pressures. Prior to this invention bathythermograph training devices were utilized which made use of a jet-pipe principle. A cam was cut to the desired sea temperature-depth contour and served as the reference signal to the jet-pipe servo mechanism. The output of the servo mechanism positioned the temperature indicator of a modified submarine bathythermograph. The disadvantage of this prior method of bathythermograph simulation is that an air supply must be available or that equipment must be available to provide air under pressure to the jet-pipe mechanisms. The present invention does away with this disadvantage and is designed to adapt the buoyancy recorder AN/BSN-1, RD-79 to use in a submarine simulator without undue change to the physical appearance of the original buoyancy recorder.

The principal object of this invention is to provide improved bathythermograph simulator apparatus.

Another object of this invention is to provide dynamic, automatic and accurate means to simulate the buoyancy of a submarine as a function of its depth, water temperature, and water salinity.

A further object of this invention is to provide improved bathythermograph simulation apparatus of an electro-mechanical nature.

Another object of the invention is to provide a bathythermograph simulator which has controllable buoyancy functions.

Other objects and many of the attendant advantages of this invention will be readily appreciated as the same becomes better understood by reference to the following detailed description when considered in connection with the accompanying drawing wherein the single FIGURE is a schematic diagram of bathythermograph simulator apparatus showing a preferred embodiment of the invention and is represented as FIGURES 1a, 1b, 1c and 1d.

The bathythermograph is a servo system. In this servo system it is assumed that sea pressure is directly proportional to depth. (This would be true if the density of sea water were not dependent upon conditions of salinity and temperature.) The maximum error that this assumption is expected to cause is 35 feet at a depth of 1,500 feet. This error would result when traveling from salt water of average salinity to fresh water. The signal of depth which is generated by an analog computer with the submarine simulator is the reference signal to a position servo mechanism which drives the depth axis of a modified standard naval bathythermograph. Located on the shaft of the motor of the depth servo, are five, non-linear potentiometers. A regulated voltage source is applied across each of these non-linear potentiometers. The variable tap of each potentiometer is respectively connected to each of the five positions of a selector switch. This selector switch applies the desired potentiometer function to the temperature servomechanism. The servo mechanism positions the recording drum of the bathythermograph in accordance with the selected potentiometer function. The non-linear potentiometer characteristics have been arbitrarily chosen to represent five different curves of sea temperature as a function of depth. The five-position selector switch is manually controlled and set for different simulation problems.

The purpose of the bathythermograph is to record changes in buoyancy. The two factors that influence buoyancy are salinity and temperature, both of which vary with depth. The inputs to the system are, the depth input signal 71 from the analog computer and the buoyancy select signals from a manually positioned control. The output from the system is a buoyancy signal 73 which is applied to the analog computer of the universal submarine simulator. As shown on the figure, the depth input signal from the analog computer goes to one end of the control winding of the depth axis magnetic amplifier 10. The other end of the control winding is connected to the wiper of the depth feedback potentiometer 12. With a change of depth input signal, current flows in the control winding of magnetic amplifier 10 causing an output from the magnetic amplifier 10. The amplifier output goes to the depth axis servo motor 14, causing it to rotate and in turn drive the wiper of feedback potentiometer 12 in a direction to balance the depth input signal. When balance is reached, there is no output from the depth axis magnetic amplifier 10 and the depth axis servo motor 14 stops. The magnetic amplifier uses a damping winding 16 whose effect can be varied by potentiometer 18.

The depth axis servo motor 14 also drives five buoyancy axis potentiometers 20, 22, 24, 26 and 28 and the pen assembly 30 for the recorder. The signals from the five buoyancy axis potentiometers go to five individual relays 32, 34, 36, 38 and 40 respectively. By means of a manual switch (which in the preferred embodiment is located in the instructor's console), any one of these five relays connecting any one of the five buoyancy signals to one end of the control winding of buoyancy axis amplifier 42 can be energized. This buoyancy signal 73 is also an input to the analog computer of the universal submarine simulator. The other end of the control winding of magnetic amplifier buoyancy axis 42 is attached to the wiper of buoyancy feedback potentiometer 44.

With a change of buoyancy signal, current flows from the control winding 46 of buoyancy amplifier 42 producing an output from the buoyancy axis magnetic amplifier 42. This output goes to buoyancy axis servo motor 48 causing it to rotate and in turn to drive the wiper of feedback potentiometer 44 in a direction to balance the buoyancy axis signal. When balance is reached, there is no output from the buoyancy axis magnetic amplifier. The buoyancy axis magnetic amplifier 42 uses a damping winding 50 whose effect can be varied by potentiometer 52. The buoyancy axis servo motor also drives the card drum assembly 54 in the recorder section of the bathythermograph simulator.

Thus, operation is as follows: With a change in depth, the depth change signal from the analog computer causes the stable conditions in the depth servo loop to vary. The depth servo loop in seeking a new stable position will change conditions in the buoyancy servo loop by varying the output from the buoyancy potentiometer. The buoyancy servo loop then seeks a new stable position and the buoyancy signal output is provided to the analog computer and to the bathythermograph indicator.

The instructor can, by switching the buoyancy function potentiometer connected to the buoyancy servo loop, simulate different environmental conditions of buoyancy and also rapidly changing environmental conditions of buoyancy.

Other parts contained in the preferred embodiment of the invention are speed reducers 56 and 58 for the card drum assembly 54 and the feedback potentiometer 44, and speed reducers 60 and 62 for the pen assembly 30 and buoyancy axis potentiometers 20, 22, 24, 26 and 28 and the feedback potentiometer 12. The magnitude of the buoyancy signal applied to the buoyancy amplifier and therefore the buoyancy servo loop response can be varied by means of buoyancy potentiometers 64. The depth input from the analog computer and therefore the depth servo loop response can similarly be varied by means of depth input adjustment potentiometer 68.

Obviously many modifications and variations of the present invention are possible in the light of the above teachings. It is therefore to be understood that within the scope of the appended claims the invention may be practiced otherwise than as specifically described.

What is claimed is:

1. In a training device, an apparatus for simulating the buoyancy of an underwater craft comprising in combination, a first servomechanism loop, depth signal means operatively connected to the input of said first loop, a second servomechanism loop, said second servomechanism loop comprising a servo amplifier, a servo motor, and feedback means, said servo amplifier being connected to said servo motor, said servo motor being connected to said feedback means and said feedback means being operatively connected to the input of said servo amplifier, and function generating means operated by said first servomechanism loop, means for operatively connecting said generating means to said servo amplifier to provide an input signal thereto, said first servo loop comprising motor means being operatively connected to drive said function generating means, whereby said second loop produces an output signal which is analogous to the buoyancy of said underwater craft, said buoyancy output being dependent upon both the characteristics of said function generating means and the input to said first loop.

2. The structure of claim 1 wherein said servo loops are of the zero nulling types whereby a shaft position is made analogous to the magnitude of an input signal.

3. The structure of claim 2 wherein said input depth signal and said output buoyancy signal are electrical levels.

4. The combination of claim 3 and indicating means operatively connected to said first and second servomechanism means, whereby the buoyancy and depth of said underwater craft are indicated.

5. The structure of claim 4 wherein the response characteristics of said second servomechanism loop are analogous to the buoyancy characteristics of a particular underwater craft and means are connected to said second loop for changing its response characteristics for conformance with different underwater craft and different environmental conditions.

6. The structure of claim 5 wherein each of said servomechanism loops comprise a motor, a magnetic amplifier, feedback means and amplitude control means.

7. The structure of claim 6 wherein the magnitude of said input signal to said first loop means is adjustable and the response characteristics of said second servomechanism are adjustable.

8. The combination of claim 7 wherein said response characteristic adjustment means comprises a manual selector switch, a multiplicity of relays and a multiplicity of specially wound potentiometers, said selector switch being connected to a source of voltage for control of said relays, each of said relays being operatively connected to one of said specially wound potentiometers, each of said potentiometers representing a different buoyancy function, whereby said selector switch controls the relay actuation thereby controlling the response characteristics of said second servo loop amplifier means.

References Cited in the file of this patent

UNITED STATES PATENTS

| | | |
|---|---|---|
| 2,560,528 | Dehmel | July 10, 1951 |
| 2,839,839 | Hartig et al. | June 24, 1958 |